US011978389B2

(12) United States Patent
Seo et al.

(10) Patent No.: US 11,978,389 B2
(45) Date of Patent: May 7, 2024

(54) DISPLAY APPARATUS

(71) Applicant: LG ELECTRONICS INC., Seoul (KR)

(72) Inventors: Daeseong Seo, Seoul (KR); Yanghyun Kim, Seoul (KR); Woosik Jung, Seoul (KR); Davin Baik, Seoul (KR); Cheolwan Choi, Seoul (KR); Insu Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/005,891

(22) PCT Filed: Jul. 30, 2021

(86) PCT No.: PCT/KR2021/009994
§ 371 (c)(1),
(2) Date: Jan. 18, 2023

(87) PCT Pub. No.: WO2022/025713
PCT Pub. Date: Feb. 3, 2022

(65) Prior Publication Data

US 2023/0290299 A1 Sep. 14, 2023

(30) Foreign Application Priority Data

Jul. 30, 2020 (KR) ........................ 10-2020-0094909

(51) Int. Cl.
*G09G 3/20* (2006.01)
*G09G 3/32* (2016.01)

(52) U.S. Cl.
CPC ......... *G09G 3/32* (2013.01); *G09G 2300/026* (2013.01); *G09G 2330/06* (2013.01)

(58) Field of Classification Search
CPC ............... G09G 3/32; G09G 2300/026; G09G 2330/06; G09G 3/2092; G09G 2310/08; G09G 2320/0693; G09G 2370/00
See application file for complete search history.

(56) References Cited

U.S. PATENT DOCUMENTS 5,659,339 A * 8/1997 Rindal .................. H04B 15/04 345/55
6,639,541 B1 * 10/2003 Quintana ............... G01S 19/21 455/226.4
(Continued)

FOREIGN PATENT DOCUMENTS

KR 1020070080168 8/2007
KR 1020120060577 6/2012
(Continued)

OTHER PUBLICATIONS

PCT International Application No. PCT/KR2021/009994, International Search Report and Written Opinion dated Nov. 23, 2021, 15 pages.
(Continued)

*Primary Examiner* — Antonio Xavier
(74) *Attorney, Agent, or Firm* — LEE, HONG DEGERMAN, KANG & WAIMEY

(57) ABSTRACT

The present disclosure relates to a display apparatus, and the display apparatus according to an embodiment comprises: a memory storing at least one command; a display comprising m display modules, where m is an integer greater than or equal to 2; and a plurality of processors that divide the m display modules, where m is an integer greater than or equal to 2, into n groups, where n is an integer greater than or equal to 2, according to the at least one command stored in the memory, and control the n groups, respectively.

10 Claims, 6 Drawing Sheets

(56) References Cited

U.S. PATENT DOCUMENTS

| | | | | |
|---|---|---|---|---|
| 7,403,184 | B1 * | 7/2008 | Moon .................. | G09G 3/3688<br>345/94 |
| 2010/0302214 | A1 * | 12/2010 | Kim ..................... | H04N 13/398<br>345/204 |
| 2011/0181558 | A1 | 7/2011 | Jeon et al. | |
| 2011/0267375 | A1 | 11/2011 | Yang et al. | |
| 2015/0187336 | A1 * | 7/2015 | Yang ........................ | G09G 3/20<br>345/213 |
| 2018/0040267 | A1 * | 2/2018 | Huang ................... | G09G 3/006 |
| 2019/0068178 | A1 * | 2/2019 | Wang ................... | H03K 5/1252 |

FOREIGN PATENT DOCUMENTS

| | | |
|---|---|---|
| KR | 10-2019-0141384 | 12/2019 |
| KR | 10-2020-0031318 | 3/2020 |
| KR | 1020200052733 | 5/2020 |

OTHER PUBLICATIONS

Korean Intellectual Property Office Application No. 10-2022-7040407, Office Action dated Dec. 7, 2023, 7 pages.

* cited by examiner

DISPLAY APPARATUS

CROSS-REFERENCE TO RELATED APPLICATION(S)

This application is the National Stage filing under 35 U.S.C. 371 of International Application No. PCT/KR2021/009994, filed on Jul. 30, 2021, which claims the benefit of earlier filing date and right of priority to Korean Application No. 10-2020-0094909, filed on Jul. 30, 2020, the contents of which are all hereby incorporated by reference herein in their entireties.

TECHNICAL FIELD

The present disclosure relates to a display device, and more particularly to display devices of various fields, each of which can control a display module.

BACKGROUND ART

Recently, display devices having excellent characteristics such as thinness, flexibility, and the like have been developed in the field of display technology. In contrast, currently commercialized major displays are represented by liquid crystal displays (LCDs), organic light emitting diodes (OLEDs), and light emitting diodes (LEDs).

On the other hand, light emitting diodes (LEDs) are semiconductor LEDs well known to convert current into light, have been used as light sources for display of images of an electronic device including information communication devices along with GaP:N-based green LEDs, starting with commercialization of red LEDs using GaAsP compound semiconductor in 1962.

Semiconductor LEDs have various advantages, such as long lifespan, low power consumption, excellent initial driving characteristics, high vibration resistance, and the like, compared to filament-based LEDs.

A display device for displaying a screen using LEDs may include micro-LEDs having a high-density array to display a high-resolution screen image. In order to display the screen image by controlling LEDs, it is necessary to control LEDs by a display driving module such as a drive IC.

A method for driving a display screen through a drive IC may include a passive matrix (PM) driving method in which the display is driven in one frame unit including a plurality of pixels and an active matrix (AM) driving method for driving pixels one by one using TFTs.

At this time, a large number of drive ICs may be required to drive the display screen. However, when a plurality of drive ICs is provided, there is a serious problem in that noise such as electromagnetic interference (EMI) occurs because the plurality of drive ICs is concentrated in a small area.

In addition, when a plurality of drive ICs operates simultaneously, EMI noise may increase as the amount of radiated energy increases according to a clock signal generated by the drive ICs.

DISCLOSURE

Technical Problem

An object of the present disclosure is to provide a display device including a controller configured to drive a display module.

Another object of the present disclosure is to provide a display device with reduced EMI noise.

Another object of the present disclosure is to provide a display device for improving efficiency by reducing an EMI debugging time.

Technical Solutions

In accordance with an aspect of the present disclosure, a display device may include a memory configured to store at least one command, a display configured to include M display modules, where M is an integer of 2 or more, and a plurality of processors configured to divide the M display modules (where M is an integer of 2 or more) into N groups (where N is an integer of 2 or more) according to at least one command stored in the memory, and control each of the N groups, wherein the plurality of processors delays and supplies a clock signal such that the N groups have different phases according to the at least one command.

The display device may further include a communication unit configured to communicate with an external device by wire or wirelessly. The N groups include a first group and a second group; the plurality of processors includes a first drive integrated circuit (IC) for controlling the first group, and a second drive IC for controlling the second group. The first drive IC performs a phase shift while supplying the clock signal to the first group, receives a value obtained by measuring a lowest electromagnetic interference (EMI) of the first group according to the phase shift through the communication unit, and delays the clock signal by a first phase and then supplies the delayed clock signal so as to have a first phase corresponding to the lowest EMI of the first group. The second drive IC performs a phase shift while supplying the clock signal to the second group, receives a value obtained by measuring a lowest EMI of the second group according to the phase shift through the communication unit, and delays the clock signal by the second phase and then supplies the delayed clock signal so as to have a second phase corresponding to the lowest EMI of the second group.

The phase shift may be performed the same number of times or different numbers of times within a predetermined same range, with respect to the N groups.

After the first drive IC performs a phase shift with respect to the first group, the second drive IC may perform a phase shift with respect to the second group.

The display device may further include a memory configured to store information about the first phase and information about the second phase.

The communication unit may transmit at least one of information about the first phase and information about the second phase with respect to the external device, may receive control information corresponding to each of the first phase and the second phase, and may transmit the control information to the processor.

The plurality of processors may measure an electromagnetic interference (EMI) emitted from a plurality of display modules. The N groups may include a first group and a second group. The plurality of drive integrated circuits (ICs) may include a first drive IC for controlling the first group and a second drive IC for controlling the second group. The first drive IC may perform a phase shift while supplying the clock signal to the first group, may measure a lowest electromagnetic interference (EMI) of the first group according to the phase shift through a measurement unit, may delay the clock signal by the first phase to have a first phase corresponding to the lowest EMI of the first group, and may supply the delayed clock signal. The second drive IC may perform a phase shift while supplying the clock signal to the second group, may measure a lowest EMI of the second group according to the phase shift through the measurement unit, may delay the clock signal by the second phase to have a second phase corresponding to the lowest EMI of the second group, and may supply the delayed clock signal.

The measuring, by the first drive IC and the second drive IC, the phase shift and the lowest EMI for the first group and the second group may be repeatedly performed until the processors calculate an optimization value of the first group and an optimization value of the second group.

The phase shift may be performed the same number of times or different numbers of times within a predetermined same range, with respect to the N groups.

After the first drive IC performs a phase shift with respect to the first group, the second drive IC may perform a phase shift with respect to the second group.

The display device may further include a memory configured to store information about the first phase and information about the second phase.

Advantageous Effects

The display device according to the embodiments of the present disclosure may have reduced EMI.

The display device according to the embodiments of the present disclosure can efficiently reduce an EMI debugging time.

The display device according to the embodiments of the present disclosure can reduce a time required for EMI result confirmation and correction/repetition.

Furthermore, according to another embodiment of the present disclosure, there are additional technical effects not mentioned herein. Those skilled in the art will appreciate such technical effects through the whole of the specification and drawings.

BEST MODE

Figure 1:
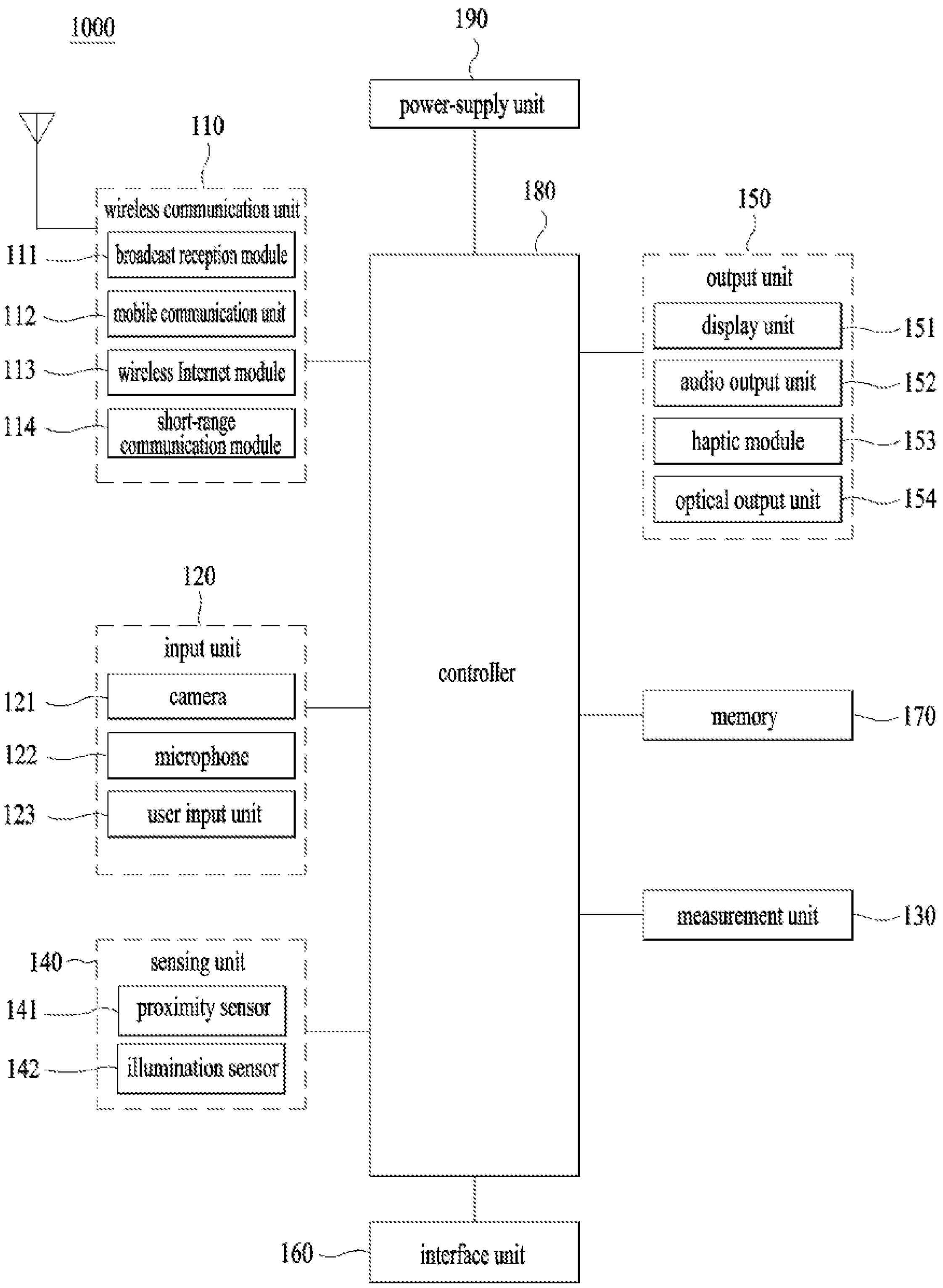
FIG. 1 is a block diagram illustrating a display device according to embodiments of the present disclosure.

Reference will now be made in detail to embodiments of the present disclosure, examples of which are illustrated in the accompanying drawings. Wherever possible, the same reference numbers will be used throughout the drawings to refer to the same or like parts, and redundant description thereof will be omitted. In describing embodiments disclosed in this specification, relevant well-known technologies may not be described in detail in order not to obscure the subject matter of the embodiments disclosed in this specification. In addition, it should be noted that the accompanying drawings are only for easy understanding of the embodiments disclosed in the present specification, and should not be construed as limiting the technical spirit disclosed in the present specification.

When an element, such as a layer, a region, or a substrate, is referred to as being "on" another component, it may be directly on another element or an intervening element may be present therebetween.

Although the terms first, second, etc. are used to describe various elements of the embodiments, these elements should not be limited by these terms. These terms are only used to distinguish one element from another. For example, a first user input signal may be referred to as a second user input signal. Similarly, the second user input signal may be referred to as a first user input signal. Use of such terms should be interpreted as not departing from the scope of the various embodiments. The first user input signal and the second user input signal are both user input signals, but do not mean the same user input signals unless clearly indicated in context.

The terminology used in the description of the embodiments herein is for the purpose of describing particular embodiments only and is not intended to be limiting. As used in the description of the various described embodiments and the appended claims, singular forms are intended to include plural forms as well, unless the context clearly indicates otherwise. The term "and/or" as used herein refers to and encompasses any and all possible combinations of one or more of the associated listed items. The term "includes" specifies the presence of stated features, numbers, steps, elements, and/or components, but does not preclude the presence or addition of one or more other features, numbers, steps, elements, and/or components thereof. A conditional expression such as "when" or "if" used in the description of the embodiments is not limitedly interpreted only as an optional case. Rather, the conditional expression has been intended such that a related operation may be performed or related definition may be interpreted when a specific condition is satisfied or in response to a specific condition.

Furthermore, although each drawing is described for convenience of description, it is also within the scope of the present disclosure that those skilled in the art implement other embodiments by combining at least two or more drawings.

When an element, such as a layer, a region, or a substrate, is referred to as being "on" another component, it may be directly on another element or an intervening element may be present therebetween.

A display device described through the embodiments is a concept including all display devices that display information as unit pixels or as a set of unit pixels. Therefore, the display device according to the present disclosure can be applied not only to finished products but also to components. For example, a panel corresponding to one component of a digital TV independently corresponds to a display device of the present specification. For example, finished products of the display device may include a mobile phone, a smartphone, a laptop, a digital broadcasting terminal, a personal digital assistant (PDA), a portable multimedia player (PMP), a navigation system, a slate PC, a tablet, an ultrabook, a digital TV, a desktop computer, and the like.

However, those skilled in the art will readily recognize that the configurations applicable to the embodiments of the present disclosure can be applied to a displayable device, even in the form of a new product to be developed in the future.

In addition, the semiconductor LED or LED mentioned in the present specification may conceptually include an LED, a micro-LED, and the like, and may be used interchangeably with the LED, the micro-LED, etc.

FIG. 1 is a block diagram illustrating a display device 1000 according to embodiments of the present disclosure.

Referring to FIG. 1, the display device 1000 may include a wireless communication unit 110, an input unit 120, a sensing unit 140, an output unit 150, an interface unit 160, a memory 170, a controller 180, a power-supply unit 190, and the like. The constituent components shown in FIG. 1 are not always required to implement the display device, such that it should be noted that the display device according to the present disclosure may include more or fewer components than the elements listed above.

More specifically, among the above-described constituent components, the wireless communication unit 110 may include at least one module for implementing any one of wireless communication between the display device 1000 and a wireless communication system, wireless communication between the display device 1000 and another display device, and wireless communication between the display device 1000 1000 and a network including an external server.

The wireless communication unit 110 may include at least one of a broadcast reception module 111, a mobile communication module 112, a wireless Internet module 113, a short-range communication module 114, and a location information module 115 such as a GPS module.

The input unit 120 may include a camera 121 or an image input unit for receiving image signals, a microphone 122 or an audio input unit for receiving audio signals, and a user input unit 123 (e.g., a touch key, a mechanical key, etc.) for receiving information from the user. Voice data or image data collected by the input unit 120 may be analyzed so that the analyzed result can be processed as a control command of the user as necessary.

The sensing unit 140 may include one or more sensors configured to sense internal information of the display device, peripheral environmental information of the display device, user information, and the like. For example, the sensing unit 140 may include at least one of a proximity sensor 141, an illumination sensor 142, a touch sensor, an acceleration sensor, a magnetic sensor, a gravity sensor (G-sensor), a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radioactivity detection sensor, a thermal sensor, and a gas sensor, etc.), and a chemical sensor (for example, an electronic nose, a healthcare sensor, a biometric sensor, and the like). On the other hand, the display device disclosed in the present disclosure may combine various kinds of information sensed by at least two of the above-described sensors, and may use the combined information.

The output unit 150 may generate output signals related to visual, auditory, tactile sensation, or the like. The output unit 150 may include at least one of a display unit 151, an audio output unit 152, a haptic module 153, and an optical (or light) output unit 154. The display unit 151 may construct a mutual layer structure along with a touch sensor, or may be formed integrally with the touch sensor, such that the display unit 151 can be implemented as a touchscreen. The touchscreen may serve as a user input unit 123 that provides an input interface to be used between the display device 1000 and the user, and at the same time may provide an output interface to be used between the display device 1000 and the user.

The interface unit 160 may serve as a passage between various types of external devices connected to the display device 1000. The interface unit 160 may include at least one of a wired/wireless headset port, an external charger port, a wired/wireless data port, a memory card port, a port connected to a device provided with an identification (ID) module, an audio input/output (I/O) port, a video input/output (I/O) port, and an earphone port. If the external device is connected to the interface unit 160, the display device 1000 may perform appropriate control related to the connected external device.

The memory 170 may store data needed to support various functions of the display device 1000. The memory 170 may store a plurality of application programs (or applications) executed in the display device 1000, and data or instructions required to operate the display device 1000. At least some of the application programs may be downloaded from an external server through wireless communication. For basic functions (e.g., an incoming call, an outgoing call, reception of a message, sending of a message, etc.) of the display device 1000, at least some of the application programs may be pre-installed in the display device 1000 at a stage of manufacturing the product. Meanwhile, the application programs may be stored in the memory 170, and may be installed in the display device 1000, so that the application programs can enable the display device 1000 to perform necessary operations (or functions).

In addition to the operation related to the application programs, the controller 180 may control overall operation of the display device 1000. The controller 180 may process signals, data, and information that are input or output through the above-described constituent components, or may drive the application programs stored in the memory 170, so that the controller 180 can provide the user with appropriate information or functions or can process the appropriate information or functions.

In order to drive the application programs stored in the memory 170, the controller 180 can control at least some of the components shown in FIGS. 1 to 7. Moreover, in order to drive the application programs, the controller 180 can combine at least two of the components included in the display device 1000, and can operate the combination of the components.

The power-supply unit 190 may receive external power or internal power under control of the controller 180, such that the power-supply unit 190 may supply the received power to the constituent components included in the display device 1000. The power-supply unit 190 may supply power to each component included in the display device 1000 by wire or wirelessly. The power-supply unit 190 may include a battery. The battery may be implemented as an embedded battery or a replaceable battery.

At least some of the components may operate in cooperation with each other to implement an operation, control, or control method of the display device 1000 according to various embodiments described below. In addition, the operation, control, or control method of the display device 1000 may be implemented on the display device 1000 by driving at least one application program stored in the memory 170.

Hereinafter, before looking at various embodiments implemented through the display device 1000 as described above, the above-listed components will be described in more detail with reference to FIG. 1.

First, a broadcast reception module 111 of the wireless communication unit 110 may receive broadcast signals and/or broadcast related information from an external broadcast management server through a broadcast channel. The broadcast channel may include a satellite channel and a terrestrial channel. Two or more broadcast reception modules can be provided to the display device 1000 for either simultaneous broadcast reception or broadcast channel switching for at least two broadcast channels.

The mobile communication module 112 may transmit and receive radio frequency (RF) signals (also called wireless signals) to and from at least one of a base station (BS), an external UE, and a server over a mobile communication network constructed in accordance with technical standards or communication methods (for example, Global System for Mobile communication (GSM), Code Division Multi Access (CDMA), Wideband CDMA (WCDMA), High Speed Downlink Packet Access (HSDPA), Long Term Evolution (LTE), etc.) for mobile communication.

The RF signal (or wireless signal) may include various types of data according to transmission and reception of a voice call signal, a video call signal, or text/multimedia messages.

The wireless Internet module 113 refers to a module for wireless Internet access, and may be embedded in or external to the mobile terminal 100. The wireless Internet module 113 is configured to transmit and receive RF signals over a communication network according to wireless Internet technologies.

The wireless Internet technology may include, for example, Wireless LAN (WLAN), Wireless-Fidelity (Wi-Fi), Wi-Fi (Wireless Fidelity) Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), etc. The wireless Internet module 113 may transmit and receive data according to at least one wireless Internet technology within a range including Internet technologies not listed above.

From the viewpoint that wireless Internet access by WiBro, HSDPA, GSM, CDMA, WCDMA, LTE, etc. is conducted through a mobile communication network, the wireless Internet module 113 performing the wireless Internet access through the mobile communication network may be understood as a type of the mobile communication module 112.

The short-range communication module 114 is configured to facilitate short-range communications. Suitable technologies for implementing such short-range communications include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communication between the display device 1000 and a wireless communication system over a wireless wide area network (WWAN), may support wireless communication between the display device 1000 and another display device over the WWAN, and may support wireless between the display device 1000 and a network in which the other audio output device (or an external server) is disposed.

Here, another display device 1000 may be at least one of a wearable device (for example, a smartwatch, smartglasses, a head mounted display (HMD), or the like), virtual reality (VR), and a mobile terminal, which can exchange data with the display device 1000 (or otherwise cooperate with the display device 1000).

The short-range communication module 114 may sense (or recognize) the wearable device, a mobile terminal, a TV, a laptop, etc. which can communicate with the display device 1000 in the vicinity of the display device 1000. In addition, when the sensed wearable device is a device which is authenticated to communicate with the display device 1000, the controller 180 may transmit at least a portion of data processed by the display device 1000 to a wearable device, a mobile terminal, a TV, a laptop, etc. through the short-range communication module 114.

The input unit 130 may be configured to input image information (or image signals), audio information (or audio signals), data, or information input by the user.

The microphone 122 may process an external audio signal into electrical voice data. The processed voice data may be utilized in various ways according to functions being performed (or an application program being executed) in the display device 1000. Various noise cancellation algorithms for cancelling (or removing) noise generated in the process of receiving an external audio signal can be implemented in the microphone 122.

The user input unit 123 may serve to receive information from the user. When information is input through the user input unit 123, the controller 180 can operate the display device 1000 to correspond to the input information. The user input unit 123 may include a remote controller, a mechanical input means (for example, a key, a button located on a front and/or rear surface or a side surface of the display device 1000, a dome switch, a jog wheel, a jog switch, and the like), and a touch input means. For example, the touch input means may include a virtual key, a soft key, or a visual key which is displayed on the touchscreen through software processing, or may be implemented as a touch key disposed on a part other than the touchscreen. Meanwhile, the virtual key or the visual key can be displayed on the touchscreen while being formed in various shapes. For example, the virtual key or the visual key may be composed of, for example, graphics, text, icon, or a combination thereof.

The measurement unit 130 may measure noise such as EMI, energy, etc. generated from the display device 1000. The measurement unit 130 may include, for example, an EMI antenna, an EMI analyzer, etc. The controller 180 may control driving or operation of the display device 1000 or perform data processing, functions, or operations related to an application program installed in the display device 1000, based on the measurement value of the measurement unit 130.

The sensing unit 140 may include one or more sensors configured to sense internal information of the display device 1000, peripheral environmental information of the display device, user information, and the like, and may generate sensing signals corresponding thereto. Based on these sensing signals, the controller 180 may control driving or operation of the display device 1000 or may process data, function, or operation related to an application program installed in the display device 1000. Representative sensors among various sensors that can be included in the sensing unit 140 will be described in more detail.

The proximity sensor 141 detects an object approaching a designated detection surface or whether or not an object is present around the proximity sensor 141 using electromagnetic force or infrared light without mechanical contact. The proximity sensor 141 may be disposed in the inner area of the display device 1000 surrounded by the touchscreen described above or disposed around the touchscreen. The proximity sensor 141 may have a longer lifespan and a higher utility than a contact sensor.

For example, the proximity sensor 141 may be a transmissive photoelectric sensor, a direct reflective photoelectric sensor, a mirror reflective photoelectric sensor, a high-frequency oscillating proximity sensor, a capacitive proximity sensor, a magnetic proximity sensor, an infrared proximity sensor, etc. If the touchscreen is a capacitive touchscreen, the proximity sensor 141 may be configured to detect proximity of an object having conductivity through change in an electric field according to proximity of the object. In this case, the touchscreen (or a touch sensor) itself may be regarded as a proximity sensor.

On the other hand, for convenience of description, an action in which an object is brought close to the touchscreen without contact and thus it is recognized that the object is located on the touchscreen is referred to as "proximity touch", and an action in which an object actually contacts the touchscreen is referred to as "contact touch". A proximity touch position of an object on the touchscreen means a position of the touchscreen vertically corresponding to the object when the object is in the proximity touch state on the touchscreen. The proximity sensor 141 may sense proximity touch and a proximity touch pattern (for example, a proximity touch distance, a proximity touch direction, a proximity touch speed, a proximity touch time, a proximity touch position, a proximity touch moving state, etc.). The controller 180 may process data (or information) corresponding to the proximity touch operation and the proximity touch pattern sensed by the proximity sensor 141 and output visual information corresponding to the processed data on the touchscreen. Further, the controller 180 may control the display device 1000 so as to process different operations or data (or information) according to whether or not touch of the object at the same point of the touchscreen is proximity touch or contact touch.

The touch sensor senses touch (or touch input) applied to the touchscreen (or the display unit 151) using at least one of various touch methods, i.e., a resistive method, a capacitive method, an infrared method, an ultrasonic method, a magnetic field method, etc.

For example, the touch sensor may be configured to convert change in pressure applied to a specific region of the touchscreen or capacitance generated from a specific region of the touchscreen into an electrical input signal. The touch sensor may be configured to detect a touch position of an object on the touchscreen, a touch area of the object, a touch pressure of the object, etc. Here, the object is an article touching the touchscreen and, for example, may be a finger, a touch pen or stylus, or a pointer.

In this way, when touch inputs are sensed by the touch sensors, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180 or the controller 180 itself.

The controller 180 may perform different control according to kinds of objects touching the touchscreen (or a touch key provided in other regions than the touchscreen), or perform equal control regardless of kinds of objects touching the touchscreen. Whether or not different control is performed or equal control is performed according to kinds of objects may be determined according to the current operating state of the display device 1000 or an application program which is being executed.

The above-described touch sensor or proximity sensor may be independently used or be combined to sense various types of touch, such as short (or tap) touch, long touch, multi-touch, drag touch, flick touch, pinch-in touch, pinch-out touch, swipe touch, hovering touch, etc., on the touchscreen.

The ultrasonic sensor may recognize position information of an object to be sensed using ultrasonic waves. Meanwhile, the controller 180 may calculate the position of a wave generation source through information sensed by an optical sensor and a plurality of ultrasonic sensors. The position of the wave generation source can be calculated using the property that light is much faster than ultrasonic waves, that is, the time for light to reach the optical sensor is much faster than the time for ultrasonic waves to reach the ultrasonic sensor. More specifically, the position of the wave generation source may be calculated by using light as a reference signal and a difference in arrival time between the reference signal and the ultrasonic signal.

Meanwhile, the camera 121, which has been described as a component of the input unit 120, is a type of camera sensor, and the camera sensor may include at least one of the camera 121, a photosensor, and a laser sensor.

The camera 121 and the laser sensor may be combined with each other to detect a touch of a sensing object to be sensed with respect to a 3D stereoscopic image. The photosensor may be stacked on the display device, and the photosensor may be configured to scan movement of the sensing object approaching the touchscreen. In more detail, the photosensor may include photodiodes and transistors in rows and columns to scan content placed on the photosensor using an electrical signal which changes according to the amount of light applied to the photodiodes. That is, the photosensor may calculate coordinates of the sensing object according to variation of light to thus obtain position information of the sensing object.

The display unit 151 may display (or output) information processed in the display device 1000. For example, the display unit 151 may display execution screen information of an application program driven in the display device 1000 or user interface (UI) and graphical user interface (GUI) information in response to the execution screen information.

The display unit 151 may also be implemented as a 3D display unit for displaying 3D images.

The 3D display unit may employ a 3D display scheme such as a stereoscopic scheme (glasses method), an auto-stereoscopic scheme (non-glasses method), a projection scheme (holographic method), or the like.

The display unit 151 will hereinafter be described in detail with reference to FIG. 2.

The audio output module 152 may output audio data received from the wireless communication unit 110 or stored in the memory 170 in a call signal reception mode, a call mode, a recording mode, a voice recognition mode, a broadcast reception mode, and the like. The audio output module 152 may also output sound signals related to functions (e.g., call signal reception sound, message reception sound, etc.) performed by the display device 1000. The audio output module 152 may include a receiver, a speaker, a buzzer, and the like.

The haptic module 153 may be configured to generate various tactile effects that a user feels, perceives, or otherwise experiences. A typical example of a tactile effect generated by the haptic module 153 is vibration. The strength, pattern and the like of the vibration generated by the haptic module 153 may be controlled by user selection or setting by the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through direct contact. Two or more haptic modules 153 may be provided according to the configuration of the display device 1000.

The optical output module 154 may output a signal for indicating an event generation using light of a light source of the display device 1000. Examples of events generated in the display device 1000 include message reception, call signal reception, a missed call, an alarm, a schedule notice, email reception, an information reception through an application, and the like.

A signal output from the optical output module 154 may be implemented when the display device emits light of a single color or multiple colors toward the front or rear surface thereof. The signal output may be terminated when the display device 1000 senses confirmation of a user's event.

The interface unit 160 may serve as an interface with every external device connected to the display device 1000. For example, the interface unit 160 may receive data transmitted from an external device, receive power to transfer to each element within the display device 1000, or transmit internal data of the display device 1000 to an external device. For example, the interface unit 160 may include wired or wireless headset ports, external charger ports, wired or wireless data ports, memory card ports, ports connected to a device having an identification (ID) module, audio input/output (I/O) ports, video I/O ports, earphone ports, and the like.

The identification (ID) module serving as a chip that stores various information for authenticating authority of using the display device 1000 may include a user identity module (UIM), a subscriber identity module (SIM), a universal subscriber identity module (USIM), and the like. In addition, the device having the identification module (hereinafter referred to as an "identification device") may be manufactured in the form of a smart card. Accordingly, the identification device can be connected to the display device 1000 through the interface unit 160.

When the display device 1000 is connected to an external cradle, the interface unit 160 may serve as a passage to allow power from the cradle to be supplied to the display device 1000 therethrough or may serve as a passage to allow various command signals input by the user from the cradle to be transferred to the display device 1000 therethrough. Various command signals or power input from the cradle may operate as signals for recognizing that the display device 1000 is properly mounted on the cradle.

The memory 170 may store programs for operations of the controller 180 and temporarily store input/output (I/O) data (for example, phonebook, messages, still images, videos, etc.). The memory 170 may store data related to various patterns of vibrations and audio which are output in response to touch inputs on the touchscreen.

The memory 170 may include at least one type of storage medium including a flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disc, and an optical disc. Also, the display device 1000 may be operated in relation to a web storage device that performs the storage function of the memory 170 over the Internet.

As described above, the controller 180 may control operations related to application programs and general operations of the display device 1000. For example, the controller 180 can execute or release a lock state for restricting a user from inputting a control command with respect to applications when a status of the display device satisfies a preset condition.

The controller 180 may perform control and processing associated with voice calls, data communication, video calls, and the like, or may perform pattern recognition processing to recognize handwriting input or picture drawing input performed on the touchscreen as characters or images, respectively. In addition, in order to implement various embodiments disclosed herein on the display device 1000, the controller 180 may control any one or a combination of the above-described components.

The power-supply unit 190 may receive external power or internal power under the control of the controller 180, and may supply appropriate power required for operating respective elements included in the display device 1000. The power-supply unit 190 may include a battery. The battery may be an embedded battery which is rechargeable or be detachably coupled to the terminal body for charging.

The power-supply unit 190 may include a connection port. The connection port may be configured as one example of the interface unit 160 electrically connected to an external charger that supplies power to charge the battery.

As another example, the power-supply unit 190 may be configured to recharge the battery in a wireless manner without using the connection port. Here, the power-supply unit 190 may receive power from an external wireless power transmitter using at least one of an inductive coupling method which is based on magnetic induction or a magnetic resonance coupling method which is based on electromagnetic resonance.

Hereinafter, the display device will be described in detail based on the components disclosed in FIG. 1.

Figure 2:
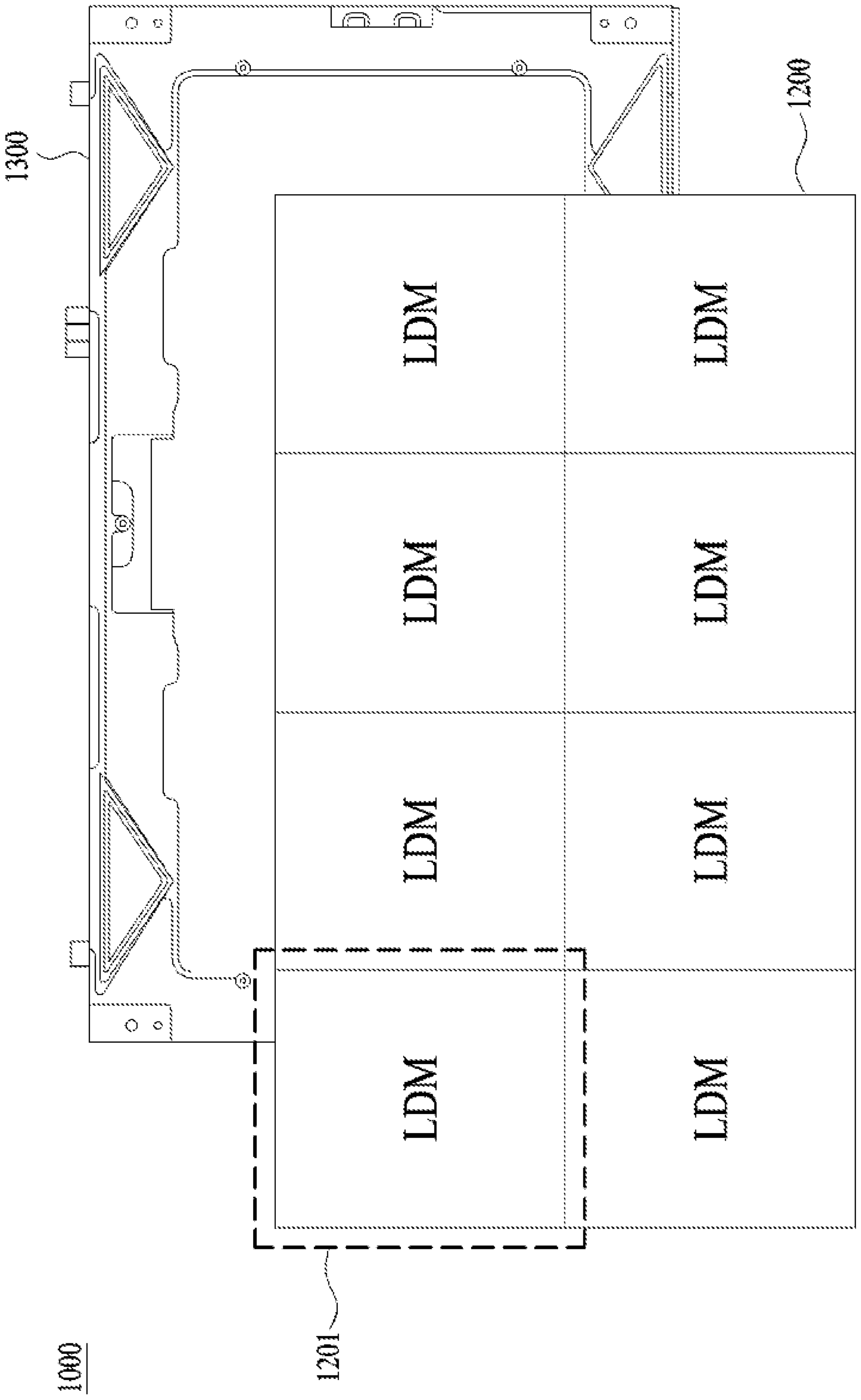
FIG. 2 is a schematic diagram illustrating a display device according to embodiments of the present disclosure.

FIG. 2 is a schematic diagram illustrating a display device according to embodiments of the present disclosure.

As shown in FIG. 2, a display device 1000 according to embodiments may include a display 1200 (e.g., the display described in FIG. 1) and a processor 1300 (e.g., the processor described in FIG. 1) for controlling the display 1200. In addition, the display device 1000 may further include a memory 1100 (see FIG. 3) storing at least one command performed by the processor 1300 (e.g., the memory described in FIG. 1).

The display 1200 according to embodiments may include one or more display modules 1201. The display 1200 may output an image or video (moving images) through one or more display modules 1201.

Unlike that shown in FIG. 2, when the display 1200 includes one display module 1201, the display 1200 and the display module 1201 have the same meaning. As shown in FIG. 2, when the display 1200 includes a plurality of display modules 1201, the display 1200 includes a display cabinet (not shown) in which the plurality of display modules 1201 is provided.

A unit pixel of the display module 1201 may be implemented by a light emitting element (not shown), and the display module 1201 may emit light through a plurality of light emitting elements. At this time, the light emitting element may be configured to convert current into light, such as, for example, a light-emitting diode (LED) or a micro-LED. Thus, the display module 1201 may include, for example, an LED display module.

Although not shown in FIG. 2, the display module 1201 and/or the display 1200 including at least one display module 1201 may include a flexible display.

For example, the flexible display may include a display that can be bent, twisted, or folded or rolled by external force. Furthermore, the flexible display may be a display manufactured on a thin flexible substrate that can be bent, curved, folded, or rolled like paper while maintaining display characteristics of a conventional flat panel display.

In a state where the flexible display is not bent (e.g., a state having an infinite radius of curvature, hereinafter referred to as a first state), a display area of the flexible display becomes a flat surface. In a state where the flexible display is bent by external force in the first state (e.g., a state having a finite radius of curvature, hereinafter referred to as a second state), the display area may be a curved surface.

Information displayed in the second state may be visual information displayed on a curved surface. The visual information may be implemented by independently controlling light emission of unit pixels arranged in a matrix form. A unit pixel means, for example, a minimum unit for implementing one color.

The processor 1300 according to embodiments may control the display module 1201. Specifically, the processor 1300 may control on/off operations of LEDs included in each display module 1201 by applying an electrical signal to the display module 1201.

The processor 1300, as a unit pixel of the display module 1201, may include, for example, a drive IC that drives LEDs. The processor 1300 may include, for example, a controller, a System On Chip (SOC), a Field Programmable Gate Array (FPGA), a Microcontroller Computer (MCU), and the like. However, the processor 1300 is not limited thereto, and includes all devices capable of driving and/or controlling the display 1200.

Hereinafter, for convenience of description, a case in which an LED is used as an example of the light emitting device of the display module 1201 and a drive IC is used as an example of the processor 1300 will be described in detail.

A drive IC according to embodiments may control on/off operations of each LED. At this time, in order to continuously output images or videos that change through a plurality of LEDs, a plurality of drive ICs is also required. However, as the size of the display 1200 gradually increases and the quality of displayed images also increases, the size of the LEDs gradually decreases and the number of LEDs required also increases. Accordingly, the number of required drive ICs is also increased.

Accordingly, there is a problem in that many more drive ICs are integrated into a limited space. That is, as the distance between the drive ICs becomes shorter, there is a problem in that electromagnetic interference (EMI) between the drive ICs located at a short distance becomes more severe. In addition, there is a problem in that, as the amount of frequency multiplication energy is increased by the clock signal of the drive IC, the increased frequency energy may affect radiation of EMI noise.

Therefore, a method for solving the EMI noise problem while driving a plurality of LEDs will hereinafter be described in detail.

Figure 3:
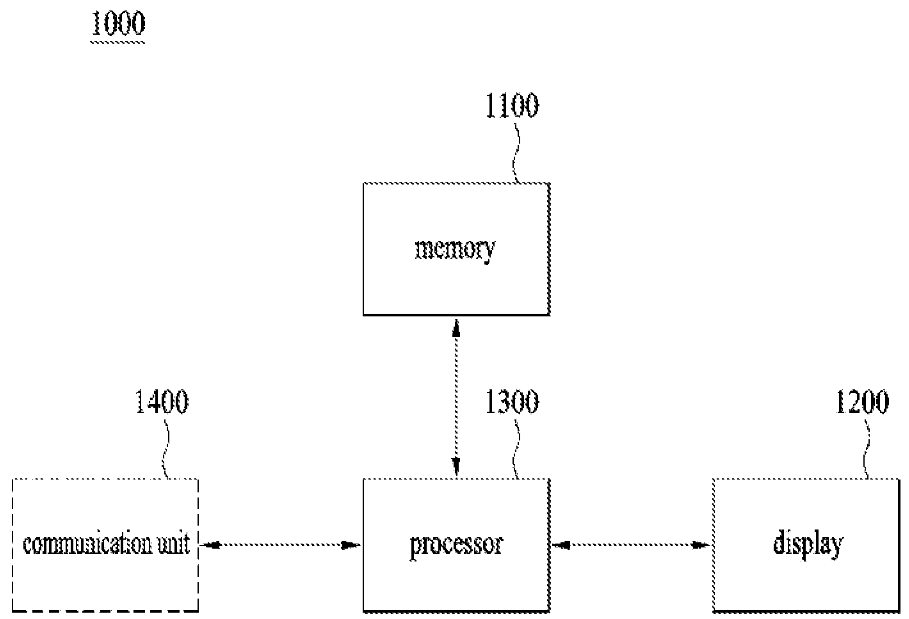
FIG. 3 is a block diagram illustrating a display device according to embodiments, and is a detailed view of a portion of the block diagram shown in FIG. 1.

FIG. 3 is a block diagram illustrating the display device 1000 according to embodiments, and is a detailed view of a portion of the block diagram shown in FIG. 1.

Referring to FIG. 3, the display device 1000 according to embodiments may include a memory 1100, a display 1200, and a processor 1300 for controlling the memory 1100 and the display 1200. In addition, the display device 1000 may further include a communication unit 1400 (e.g., the wireless communication unit described in FIG. 1) capable of communicating with an external device through wired or wireless communication.

The memory 1100 may store at least one command for the processor 1300 to control components included in the display device 1000 (e.g., the components described in FIG. 1). The memory 1100 may store various data generated when the processor 1300 controls components included in the display device 1000. In addition, the memory 1100 may store all kinds of data transmitted from an external server or external device through the communication unit 1400.

The display 1200 may include one or more display modules 1201. The display 1200 may display (or output) an image or video through one or more display modules 1201 (see FIG. 2). Details of the display 1200 are the same as or similar to those described with reference to FIG. 2, and thus a description thereof is omitted.

The processor 1300 may control the constituent components included in the display device 1000, and may control, for example, the display 1200. In the description of the processor 1300, descriptions overlapping those of FIGS. 1 and 2 will herein be omitted.

When the display 1200 includes a plurality of display modules 1201 (i.e., M display modules, where M is an integer of 2 or more), the processor 1300 may divide the M display modules 1201 to 1208 into N groups based on at least one command stored in the memory 1100, and may control each of the M display modules, which will be described in detail with reference to FIGS. 4 and 5.

The processor 1300 may include a plurality of processors 1300 to control each of the N groups. For example, the processor 1300 may include an integer number of drive ICs (where the integer is equal to or higher than N). As each processor 1300 controls each display module, the display module may have a faster image implementation speed. Furthermore, a plurality of processors 1300 is provided, the display device according to the embodiments can further reduce the time required to drive display modules for only one frame.

In addition, the processor 1300 may include a plurality of processors 1300 so as to group and control N groups, for example, may include W drive ICs (where 'W' is greater than 1 and less than N). As the number of processors 1300 is adjusted to be smaller than the number of N groups, the embodiments may reduce thermal, electrical, magnetic noise and interfering substances generated by the processors 1300. In addition, the embodiments are advantageous in terms of cost reduction. Moreover, since a plurality of processors 1300 is provided, the embodiments can reduce the time required to drive the display modules for only one frame.

In addition, the processor 1300 may include one processor 1300 that controls the N groups at once. Since only one processor 1300 is provided, the embodiments can reduce frequency multiplication energy generated from the processors 1300 provided in an integrated space, and can also reduce EMI noise radiation. In addition, overload caused by simultaneously driving the plurality of processors 1300 can be prevented.

However, regardless of the number of display modules 1201 controlled by the processors 1300 or the number of processors 1300, the display device 1000 according to the embodiments can reduce frequency multiplication energy and EMI noise radiation generated from the processors 1300 provided in the limited space. In addition, the display device 1000 can reduce costs and power consumption.

The processor 1300 may delay and supply a clock signal so that the groups of N display modules 1201 have phases different from each other according to at least one command stored in the memory 1100.

Specifically, the processor 1300 may input a reference signal to the display modules 1201. The reference signal may include a clock signal. At this time, the clock signal may include a data clock signal and a gray scale clock signal. Also, the clock signal may further include a latch clock signal. Also, the reference signal may also include a data signal.

The reference signal may be a preset value and can be adjusted as needed. In this case, the reference signal may include a preset variable range with respect to a preset frequency and phase. The preset frequency and the preset variable range may also be adjusted as needed.

The processor 1300 may phase-shift the reference signal. The processor 1300 may perform a phase shift within a variable range, may acquire data for a phase delay portion having the lowest radiation value, and may store the acquired data in the memory 1100. The processor 1300 may transmit data acquired through the communication unit 1400 to the outside. The processor 1300 may perform this phase shift and data acquisition process for the N display module groups. In this case, from among the N groups, the number (N) of groups may be set to an arbitrary value that can be adjusted as needed (where 'N' is an integer of 2 or more).

The processor 1300 may delay and supply one or more clock signals to the display modules 1201 so as to have the lowest radiation value based on the acquired data. That is, the processor 1300 may obtain a delayed period by checking the phase having the lowest EMI value, and may delay and supply the clock signal to the display modules 1201 by a predetermined time corresponding to the delayed period.

Through the above-described phase shift, the processor 1300 may adjust the timing of the clock signals to be supplied to the display 1200 in consideration of EMI. Accordingly, the processor 1300 can efficiently supply the clock signals to the display 1200.

Accordingly, the display device 1000 may have low EMI. In addition, since the display device efficiently supplies the clock signals, the display device 1000 can generate lower frequency multiplication energy than the frequency multiplication generated by simultaneously supplying the clock signals.

A method for driving the processor 1300 will hereinafter be described with reference to FIG. 4.

Figure 4:
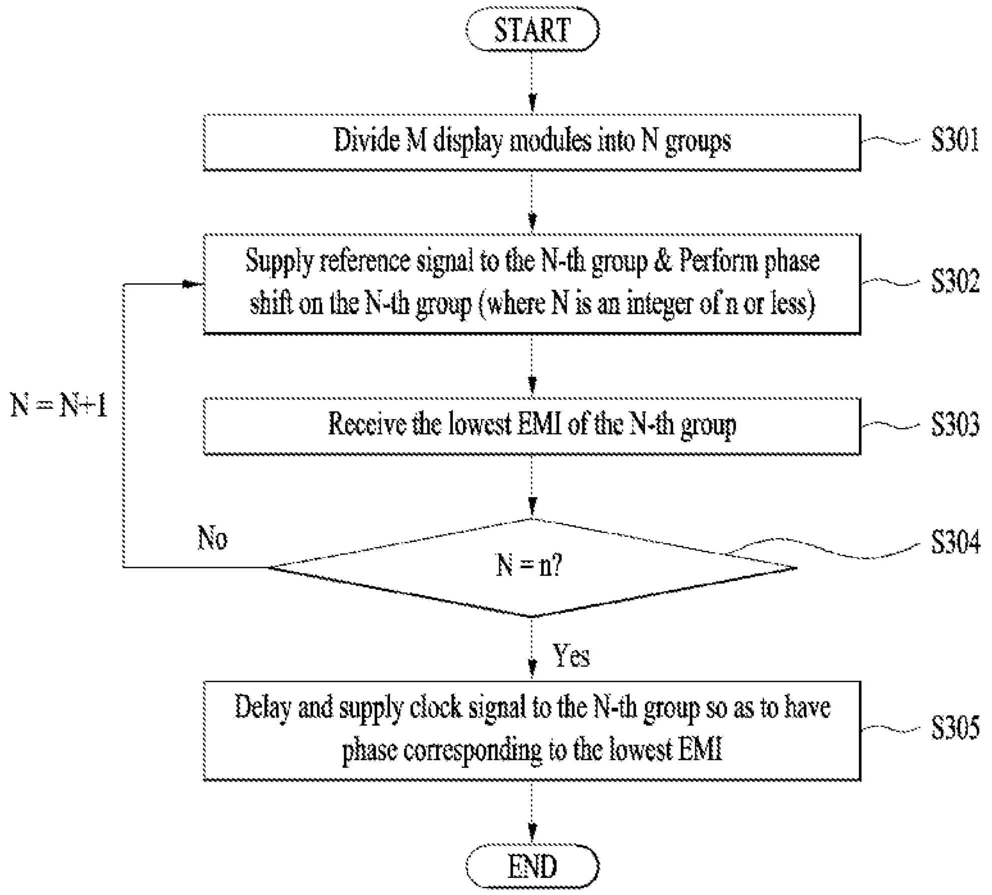
FIG. 4 is a flowchart illustrating a method for driving the display device according to the embodiments of the present disclosure, and is a flowchart illustrating the embodiment shown in FIG. 3.

FIG. 4 is a flowchart illustrating a method for driving the display device according to the embodiments of the present disclosure, and is a flowchart illustrating the embodiment shown in FIG. 3.

Referring to FIG. 4, the display device 1000 according to the embodiments is driven according to steps S301 to S305.

At this time, the display device 1000 may include a memory 1100, a display 1200 including M display modules 1201 to 1208 (see FIG. 5) (where M is an integer of 2 or more), and a communication unit 1400 for communicating with an external device by wire or wirelessly, and a processor 1300 that controls the memory 1100, the display 1200, and the communication unit 1400.

For the respective constituent components of the display device 1000, descriptions overlapping those of FIGS. 1 to 3 will herein be omitted for clarity.

A method for driving the display device 1000 according to embodiments may include dividing the M display modules 1201 to 1208 into N groups by the processor 1300 (S301). At this time, N is a positive integer greater than or equal to 2 that is equal to or greater than M. When N is set to 2 or more, N groups may include a first group and a second group.

The processor 1300 may control N groups. The processor 1300 may include a plurality of drive ICs including a first drive IC and a second drive IC. At this time, the first drive IC may control the first group, and the second drive IC may control the second group. Although the first drive IC and the second drive IC are described for convenience of description, a plurality of drive ICs may be included in each of the first drive IC and the second drive IC. That is, the plurality of drive ICs included in the first drive IC can control one first group. More specifically, the first drive IC may include as many drive ICs as the number of LED packages included in the display modules included in the first group, and each drive IC may control each LED package. Of course, it is also possible for one drive IC to control a plurality of LED packages, one display module, or one display module group. Also, for convenience of explanation, a configuration in which the processor 1300 includes a plurality of drive ICs is described as an example, but the processor 1300 may have various embodiments as described in FIG. 2.

The method for driving the display device 1000 may include supplying, by a drive IC, a reference signal to a group of display modules 1201 to 1208, and performing a phase shift (S302). Also, the method for driving the display device 1000 may include receiving the lowest EMI value for the group of display modules 1201 to 1208 (S303). The above-described steps may be performed for all display modules 1201 to 1208 (S304).

Specifically, the first drive IC may supply a reference clock signal as a reference signal to the first group. Further, a phase shift may be performed on the reference clock signal. In this case, the first drive IC may receive a value obtained by measuring the lowest EMI of the first group in the phase-shifted value from the outside through the communication unit 1400.

Also, the second drive IC may supply a reference clock signal as a reference signal to the second group. Further, a phase shift may be performed on the reference clock signal. In this case, the second drive IC may receive a value obtained by measuring the lowest EMI of the second group in the phase-shifted value from the outside through the communication unit 1400. At this time, the first phase and the second phase may have different values.

The display device 1000 can reduce the time required for EMI debugging later by confirming the lowest EMI through a phase delay.

Meanwhile, the processor 1300 may store information about the first phase of the first group and the second group and information about the second phase of the first group and the second group in the memory 1100. At this time, the information on the first and second phases may include the first and second phase delay levels, the lowest EMI values in the first and second phases, and the level of power consumed in the first and second phases, but is not limited thereto, and may include all relevant information used for such phase delay.

The display device 1000 may derive meaningful data by storing corresponding information in the memory 1100. For example, the processor 1300 may more efficiently control a frequency or a variable range set during a phase shift based on information stored in the memory 1100.

FIG. 4 illustrates that the lowest EMI value is received by performing a phase shift on the first group and the other lowest EMI value is then received by performing a phase shift on the second group, but is not limited thereto. That is, the method for driving the display device 1000 may receive the lowest EMI value for each group after the phase shift for each group has been performed. For example, the phase shift for the first group is first performed, the phase shift for the second group is then performed, and the lowest EMI values for the first group and the second group can thus be received.

In addition, steps S302 to S304 may be repeated several times for the entirety of the display modules 1201 to 1208. That is, the steps of S302 to S304 may be repeated an arbitrary number of times to find the most efficient phase delay point.

As can be seen from FIG. 4, the display device 100 may sequentially receive the phase shift and EMI values for each group, such that the display device 1000 has no possibility of overload and can output seamless natural images without interruption.

Also, unlike the case shown in FIG. 4, the phase shift and EMI value reception for each group may be performed simultaneously. Through this, the display device 1000 can increase the image implementation speed.

The communication unit 1400 may transmit information stored in the memory 1100 to an external device or external server. Also, the communication unit 1400 may receive control information corresponding to the transmitted information and transfer the received control information to the processor 1300. The processor 1300 may control the display 1200 based on the control information received through the communication unit 1400.

The method for driving the display device 1000 may include delaying and supplying, by the processor 1300, a clock signal to have a phase corresponding to the lowest EMI to a group of display modules 1201 to 1208 (S305).

Specifically, the first drive IC may control the first group so that the first group has a first phase corresponding to the lowest EMI of the first group. That is, the first drive IC may delay a clock signal of the first group by a first phase as compared to the reference signal, and may then supply the resultant clock signal.

Also, the second drive IC may control the second group so that the second group has a second phase corresponding to the lowest EMI of the second group. That is, the second drive IC may delay a clock signal of the second group by a first phase as compared to the reference signal, and may then supply the resultant clock signal.

That is, the processor 1300 may perform variation (delaying) of a clock signal in units of display modules or in units of a display module group, and may configure and supply the resultant clock signal. For example, the processor 1300 may perform variation (delaying) of a data clock signal and/or a gray scale clock signal, and may configure and supply the resultant data clock signal and/or the resultant gray scale clock signal.

As described above, the display device 1000 can be efficiently driven by dividing the M display modules 1201 to 1208 into N groups and generating a difference in clock signal between the display modules. That is, the display device 1000 may use a phase-shifted clock signal for each display module 1201 to 1208 or for each group of display modules 1201 to 1208, thereby preventing frequency multiplication energy from being concentrated on one point. In addition, the display device 1000 can improve problems caused by EMI.

Hereinafter, an example in which a clock signal is varied and supplied according to embodiments will be described with reference to FIG. 5.

Figure 5:
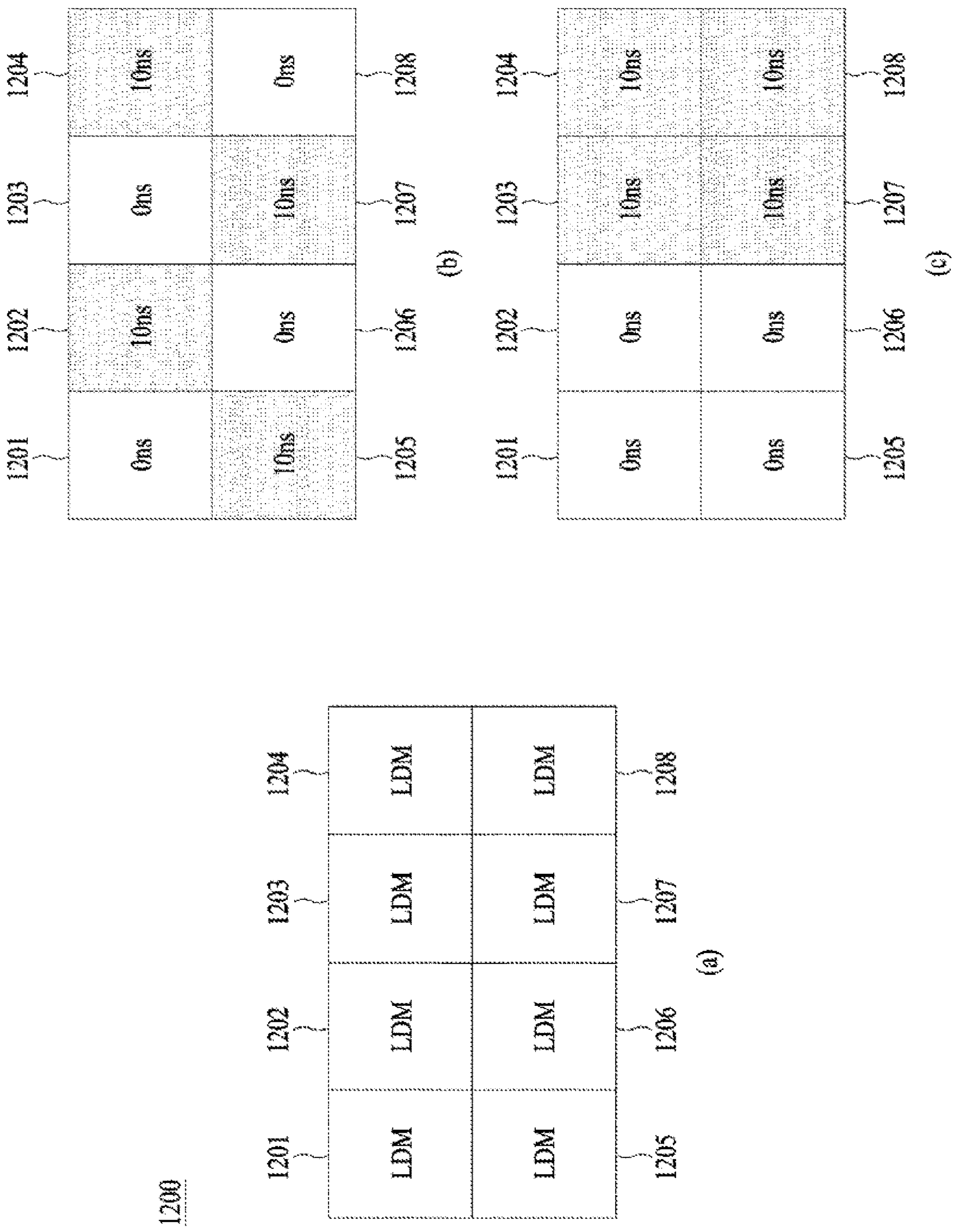
FIG. 5 illustrates examples of driving the display device according to the embodiments of the present disclosure.

FIG. 5 is a diagram illustrating examples of driving the display device according to embodiments.

FIG. 5(*a*) illustrates a display 1200 including a plurality of display modules. Specifically, FIG. 5(*a*) illustrates a display 1200 including eight display modules 1201 to 1208.

The processor 1300 may delay and supply clock signals to the display modules 1201 to 1208 through the processes described in FIGS. 2 to 4. For example, the processor 1300 may divide eight display modules 1201 to 1208 into two display module groups, and may delay and supply the clock signal to the two display module groups. However, the above-described example is disclosed only for illustrative purposes, and the number of groups may be set to any one of 1 to 8.

FIG. 5(*b*) illustrates a first example in which eight display modules 1201 to 1208 are divided into two groups. Specifically, as shown in FIG. 5(*b*), the processor 1300 may divide the display modules 1201 to 1208 into the first group including four display modules 1201, 1203, 1206 and 1208 and a second group including four display modules 1202, 1204, 1205 and 1207, so that the clock signal is delayed and supplied to the respective display modules.

For example, the first group may have the lowest EMI value with respect to the reference clock signal. In this case, the first group may receive a clock signal without a phase delay in preparation for the reference clock signal. Also, for example, the second group may have the lowest EMI value at a point where a phase delay of 10 ns is present with respect to the reference clock signal. The second group may receive a clock signal with a phase delay of 10 ns compared to the reference clock signal. Accordingly, the display device according to the embodiments can efficiently supply a clock signal to each group.

FIG. 5(*c*) shows a second example in which eight display modules 1201 to 1208 are divided into two groups, and the first and second examples may have the same number of groups but have different group configurations. Specifically, as can be seen from FIG. 5(*c*), the processor 1300 may divide the display modules 1201 to 1208 into a first group including four display modules 1201, 1202, 1206 and 1208 and a second group including four display modules 1203, 1204, 1207 and 1208, so that the clock signal is delayed and supplied to the respective display modules.

For example, the first group may have the lowest EMI value with respect to the reference clock signal. In this case, the first group may receive a clock signal without a phase delay in preparation for the reference clock signal. Also, for example, the second group may have the lowest EMI value at a point where a phase delay of 10 ns is present with respect to the reference clock signal. The second group may receive a clock signal with a phase delay of 10 ns compared to the reference clock signal. Accordingly, the display device according to the embodiments can efficiently supply a clock signal to each group.

As shown in FIG. 5, the processor 1300 may arbitrarily group the display modules 1201 to 1208. At this time, the configuration of the display modules 1201 to 1208 used for such grouping and the number of positions of the display modules 1201 to 1208 can be adjusted as needed.

Figure 6:
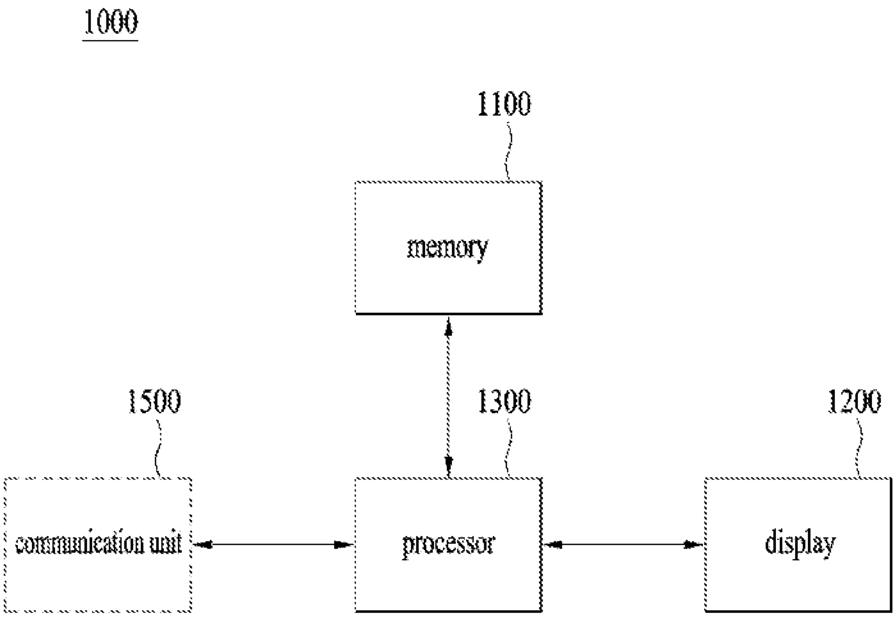
FIG. 6 is a block diagram illustrating a display device according to embodiments, and is a detailed view of a portion of the block diagram shown in FIG. 1.
Figure 7:
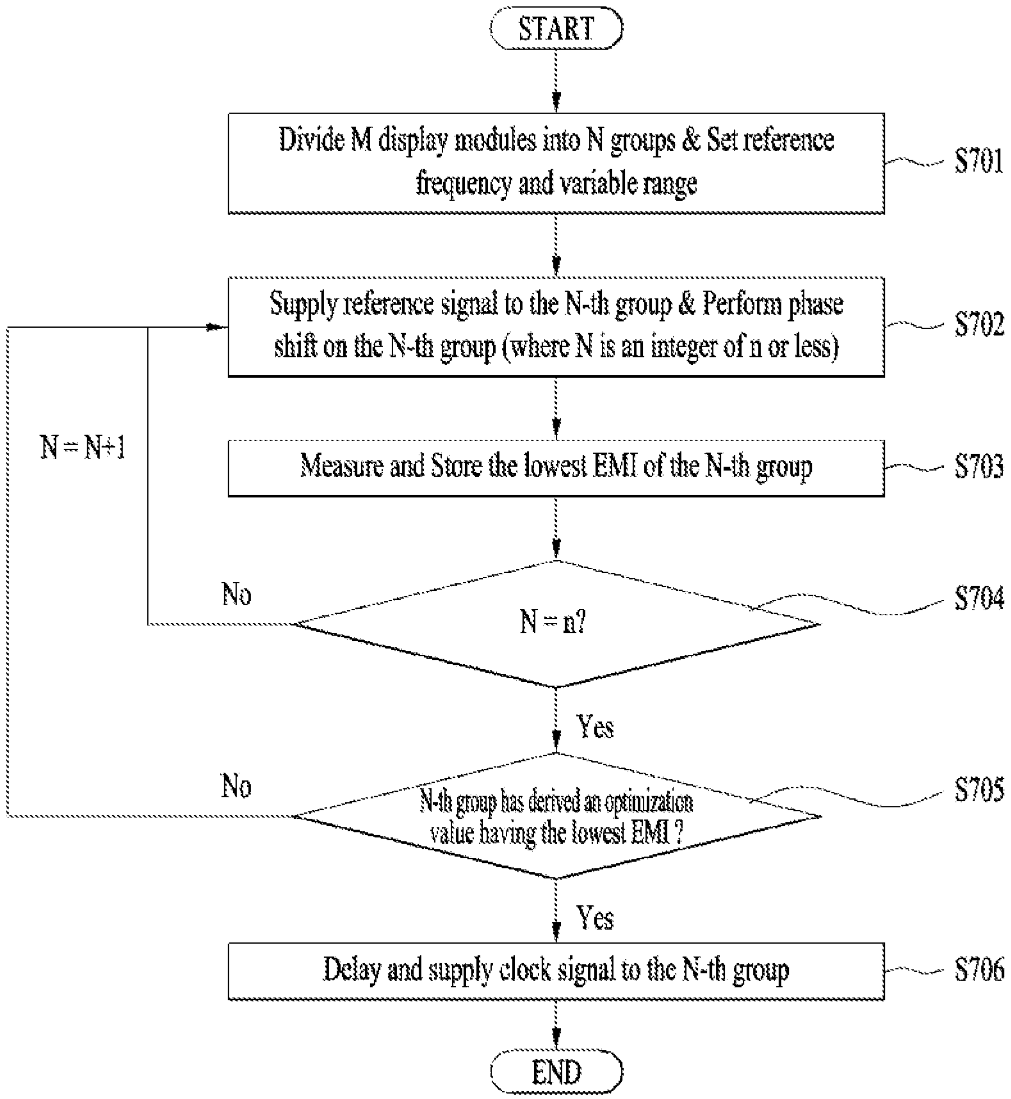
FIG. 7 is a flowchart illustrating a method for driving the display device according to the embodiments of the present disclosure, and is a flowchart illustrating the embodiment shown in FIG. 6.

In FIGS. 6 and 7, content described in FIGS. 3 and 4 without intervention of an external server or external device for the display device 1000 will be described.

FIG. 6 is a block diagram illustrating a display device 1000 according to embodiments, and is a detailed view of a portion of the block diagram shown in FIG. 1.

Referring to FIG. 6, the display device 1000 may include a memory 1100, a display 1200, and a processor 1300 for controlling the memory 1100 and the display 1200. Details identical or similar to those described in FIGS. 1 to 5 for each component, signals, and driving processes will herein be omitted.

The memory 1100 may store at least one command for allowing the processor 1300 to control components included in the display device 1000.

The display 1200 according to embodiments may include one or more display modules 1201.

The processor 1300 may control the respective constituent components included in the display device 1000. For example, the processor 1300 may control the display 1200. In this case, the processor 1300 may further include a function of measuring the EMI value emitted from the display 1200, but is not limited thereto. If necessary, a separate measurement unit 1500 (for example, the measurement unit of FIG. 1) may also measure the EMI value. Alternatively, the measurement unit 1500 and the processor 1300 may be the same components.

The display device 1000 can automatically assign a deviation to a clock signal by allowing the processor 1300 to measure the EMI value or allowing the measurement unit 1500 to measure the EMI value. That is, the display device 1000 can automatically check the degree of delay according to the phase delay and can supply the signal at the most efficient and optimum timing.

Accordingly, the display device 1000 may automatically vary the timing of the clock signal to implement the most appropriate timing, and may supply the resultant clock signal to the display modules, thereby reducing the amount of EMI emission energy to be summed.

FIG. 7 is a flowchart illustrating a method for driving the display device according to the embodiments of the present disclosure, and is a flowchart illustrating the embodiment shown in FIG. 6.

Referring to FIG. 7, the display device 1000 is driven according to steps S701 to S706.

In this case, the display device 1000 may include a memory 1100, a display 1200 including M display modules 1201 to 1208 (see FIG. 5) (where M is an integer of 2 or more), and a processor 1300 that controls the memory 1100, the display 1200, and the communication unit 1400.

For the respective constituent components of the display device 1000, descriptions overlapping those of FIGS. 1 to 6 will herein be omitted for clarity.

A method for driving the display device 1000 according to embodiments may include dividing the M display modules into N groups, and setting variable ranges for a reference frequency and a phase delay (S701). At this time, N is a positive integer greater than or equal to 2 that is equal to or greater than M. When N is set to 2 or more, N groups may include a first group and a second group.

The processor 1300 may control N groups. The processor 1300 may include a plurality of drive ICs including a first drive IC and a second drive IC. At this time, the first drive IC may control the first group, and the second drive IC may control the second group. The first drive IC and the second drive IC are described for convenience of description, but are not limited thereto, and it should be noted that a plurality of drive ICs may be included in each of the first drive IC and the second drive IC. That is, a plurality of drive ICs included in the first drive IC can control one first group. More specifically, the first drive IC may include as many drive ICs as the number of LED packages included in the display modules included in the first group, and each drive IC may control each LED package. Of course, it is also possible for one drive IC to control a plurality of LED packages, one display module, or one display module group. Also, for convenience of explanation, a configuration in which the processor 1300 includes a plurality of drive ICs is described as an example, but the processor 1300 may have various embodiments as described in FIG. 2.

The method for driving the display device 1000 may include supplying, by a drive IC, a reference signal to a group of display modules 1201 to 1208, and performing a phase shift (S702). Also, the method for driving the display device 1000 may include measuring and storing the lowest EMI value for each group of display modules 1201 to 1208 (S703). The above-described steps may be performed for all display modules 1201 to 1208 (S704).

Specifically, the first drive IC may supply a reference clock signal as a reference signal to the first group. Further, a phase shift may be performed on the reference clock signal. At this time, the first drive IC may measure the lowest EMI of the first group in the phase-shifted value and may store the measured EMI in the memory 1100. However, the scope or spirit of the present disclosure is not limited thereto, and a separate measurement unit (e.g., 1500) may also measure the lowest EMI of the first group.

In addition, the second drive IC may supply a reference clock signal as a reference signal to the second group. Further, a phase shift may be performed on the reference clock signal. At this time, the second drive IC may measure the lowest EMI of the second group in the phase-shifted value and may store the measured EMI in the memory 1100. However, the scope or spirit of the present disclosure is not limited thereto, and a separate measurement unit (e.g., 1500) may also measure the lowest EMI of the second group.

The display device 1000 can reduce the time required for EMI debugging later by checking the lowest EMI through a phase delay.

FIG. 7 illustrates that the lowest EMI value is received by performing a phase shift on the first group and the other lowest EMI value is then received by performing a phase shift on the second group, but is not limited thereto. That is, the method for driving the display device 1000 may receive the lowest EMI value for each group after the phase shift for each group has been performed. For example, the phase shift for the first group is first performed, the phase shift for the second group is then performed, and the lowest EMI values for the first group and the second group can thus be received.

In addition, steps S702 to S704 may be repeated several times for the entirety of the display modules 1201 to 1208. That is, the same process may be repeated a plurality of times within a preset variable range. Accordingly, the steps of S702 to S704 may be repeated an arbitrary number of times to find the most efficient phase delay point.

As can be seen from FIG. 7, the display device 100 may sequentially receive the phase shift and EMI values for each group, such that the display device 1000 has no possibility of overload and can output seamless natural images without interruption.

Also, unlike the case shown in FIG. 7, the phase shift and EMI value reception for each group may be performed simultaneously. Through this, the display device 1000 can increase the image implementation speed.

The method for driving the display device 1000 may include determining whether the processor 1300 has derived an optimization value that allows each group to have the lowest EMI (S705). In this case, the optimization value means a phase delay value for the lowest value of EMI.

The processor 1300 may calculate whether information about arrival or non-arrival to the optimization was calculated within a preset time, may calculate whether an objective value has a preset EMI or less, may calculate whether an objective value is equal to or less than a preset total amount of EMI energy, and may calculate the degree of phase delay, so that the processor 1300 can recognize whether optimization was implemented based on the result of such calculation. For example, when the objective value does not reach the preset total amount of EMI energy and exceeds a preset time, the processor 1300 may determine a corresponding point to be an optimization value. Alternatively, in a situation where each of some groups has a value equal to or greater than the preset EMI, when the values of the some groups become equal to or less than the preset total amount of EMI energy, the processor 1300 may determine the corresponding point to be an optimization value.

The method for driving the display device 1000 may include delaying and supplying a clock signal to each group (S706).

Specifically, the first drive IC may control the first group so that the first group has a first phase corresponding to the lowest EMI of the first group. That is, the first drive IC may delay a clock signal of the first group by a first phase compared to the reference signal, and may supply the resultant clock signal.

Also, the second drive IC may control the second group so that the second group has a second phase corresponding to the lowest EMI of the second group. That is, the second drive IC may delay a clock signal of the second group by a first phase compared to the reference signal, and may supply the resultant clock signal.

That is, the processor 1300 may perform variation (delay) of a clock signal in units of display modules or in units of a display module group, and may configure and supply the resultant clock signal. For example, the processor 1300 may perform variation (delay) of a data clock signal and/or a gray scale clock signal, and may configure and supply the resultant data clock signal and/or the resultant gray scale clock signal.

As described above, the display device 1000 can be efficiently driven by dividing the M display modules 1201 to 1208 into N groups and generating a difference in clock signal between the display modules. That is, the display device 1000 may use a phase-shifted clock signal for each display module 1201 to 1208 or for each group of display modules 1201 to 1208, thereby preventing frequency multiplication energy from being concentrated on one point. In addition, the display device 1000 can address improve problems caused by EMI.

In addition, the display device 1000 has a faster processing speed by determining an appropriate reference frequency, an appropriate variable range, and an appropriate phase shift and automatically calculating an optimization value based on the result of determination.

The display device 1000 automatically varies the timing of a clock signal to be supplied and supplies the resultant clock signal to the display modules so as to implement the most appropriate timing, thereby reducing the amount of EMI emission energy to be summed.

The embodiments described in FIGS. 6 to 7 can obtain the effect of EMI emission energy reduction according to a clock signal delay that is the same as or similar to the example described in FIG. 5.

Terms such as first and second used in this specification may be used to describe various components according to embodiments. However, various components according to embodiments should not be limited by the above terms. These terms are only used to distinguish one component from another. For example, a first learning model may be referred to as a second learning model, and similarly, a second learning model may be referred to as a first learning model, and such a change should be interpreted as not departing from the scope of the various embodiments described above. Although both the first learning model and the second learning model are learning models, they are not interpreted as the same virtual object unless the context clearly indicates.

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

That is, the present specification has been described with reference to the accompanying drawings, but the present specification is not limited to a specific embodiment, and various contents capable of being modified by a person skilled in the art to which the present disclosure pertains belongs to the scope of the right according to the claims. Further, such modifications are not to be individually understood from the technical idea of the present disclosure.

Throughout the document, although preferred embodiments of the present disclosure have been described with reference to appended drawings, the present disclosure is not limited to the embodiments above. Rather, it should be noted that various modifications of the present disclosure may be made by those skilled in the art to which the present disclosure belongs without departing from the technical scope of the present disclosure defined by the appended claims, and these modifications should not be understood individually from the technical principles or aspects of the present disclosure.

The present document describes both of the product invention and the process invention, and depending on the needs, descriptions of the respective inventions may be applied in a supplementary manner.

Those skilled in the art will understand that the present disclosure may be changed and modified in various ways without departing from the spirit or range of the present disclosure. Accordingly, the present disclosure is intended to include all the changes and modifications provided by the appended claims and equivalents thereof.

In this specification, both apparatus and method inventions are mentioned in this specification and descriptions of both of the apparatus and method inventions may be complementarily applicable to each other.

What is claimed is:

1. A display device comprising:

a memory configured to store at least one command;

a display configured to include M display modules, where M is an integer of 2 or more;

a plurality of processors configured to divide the M display modules into N groups according to the at least one command stored in the memory, and control each of the N groups, where N is an integer of 2 or more, wherein the plurality of processors delays and supplies a clock signal such that the N groups have different phases according to the at least one command; and a transceiver configured to communicate with an external device by wire or wirelessly;

wherein the N groups include a first group and a second group;

the plurality of processors includes a first drive integrated circuit (IC) for controlling the first group, and a second drive IC for controlling the second group;

the first drive IC performs a first phase shift while supplying the clock signal to the first group, receives a value obtained by measuring a lowest electromagnetic interference (EMI) of the first group according to the first phase shift through the transceiver, and delays the clock signal by a first phase and then supplies the delayed clock signal so as to have a first phase corresponding to the lowest EMI of the first group; and the second drive IC performs a second phase shift while supplying the clock signal to the second group, receives a value obtained by measuring a lowest EMI of the second group according to the second phase shift through the transceiver, and delays the clock signal by a second phase and then supplies the delayed clock signal so as to have a second phase corresponding to the lowest EMI of the second group.

2. The display device according to claim 1, wherein:

the first phase shift and the second phase shift are performed the same number of times or different numbers of times within a predetermined same range, with respect to the N groups.

3. The display device according to claim 1, wherein:

after the first drive IC performs the first phase shift with respect to the first group, the second drive IC performs the second phase shift with respect to the second group.

4. The display device according to claim 1, further comprising:

a memory configured to store information about the first phase and information about the second phase.

5. The display device according to claim 1, wherein:

the transceiver transmits at least one of information about the first phase or information about the second phase with respect to the external device, receives control information corresponding to each of the first phase and the second phase, and transmits the control information to the processor.

6. A display device comprising:

a memory configured to store at least one command;

a display configured to include M display modules, where M is an integer of 2 or more; and a plurality of processors configured to divide the M display modules into N groups according to the at least one command stored in the memory, and control each of the N groups, where N is an integer of 2 or more, wherein the plurality of processors delays and supplies a clock signal such that the N groups have different phases according to the at least one command, and wherein:

the plurality of processors measures an electromagnetic interference (EMI) emitted from a plurality of display modules;

the N groups include a first group and a second group;

a plurality of drive integrated circuits (ICs) includes a first drive IC for controlling the first group and a second drive IC for controlling the second group;

the first drive IC performs a first phase shift while supplying the clock signal to the first group, measures a lowest electromagnetic interference (EMI) of the first group according to the first phase shift through a noise receiver, delays the clock signal by a first phase to have a first phase corresponding to the lowest EMI of the first group, and supplies the delayed clock signal; and the second drive IC performs a second phase shift while supplying the clock signal to the second group, measures a lowest EMI of the second group according to the second phase shift through the noise receiver, delays the clock signal by a second phase to have a second phase corresponding to the lowest EMI of the second group, and supplies the delayed clock signal.

7. The display device according to claim 6, wherein:

the measuring, by the first drive IC and the second drive IC, the respective phase shift and the respective lowest EMI for the first group and the second group is repeatedly performed until the processors calculate an optimization value of the first group and an optimization value of the second group.

8. The display device according to claim 6, wherein:

the first phase shift and the second phase shift are performed the same number of times or different numbers of times within a predetermined same range, with respect to the N groups.

9. The display device according to claim 6, wherein:

after the first drive IC performs the first phase shift with respect to the first group, the second drive IC performs the second phase shift with respect to the second group.

10. The display device according to claim 6, further comprising:

a memory configured to store information about the first phase and information about the second phase.

* * * * *